United States Patent
Sterkel et al.

(10) Patent No.: US 8,594,931 B2
(45) Date of Patent: *Nov. 26, 2013

(54) ONBOARD LOCATION-BASED IN-FLIGHT ENTERTAINMENT AND INFORMATION

(75) Inventors: Tyler J. Sterkel, San Francisco, CA (US); Gregory Dicum, San Francisco, CA (US); Tyler J. Freeman, San Francisco, CA (US); Michal J. Migurski, Oakland, CA (US)

(73) Assignee: Window Seat, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,028

(22) Filed: Mar. 5, 2012

(65) Prior Publication Data

US 2012/0232791 A1 Sep. 13, 2012

Related U.S. Application Data

(60) Provisional application No. 61/451,097, filed on Mar. 9, 2011.

(51) Int. Cl.
*G01C 21/00* (2006.01)
(52) U.S. Cl.
USPC .......................................... 701/454; 701/516
(58) Field of Classification Search
USPC ......... 701/400, 409, 422, 425, 428, 454, 516; 705/14.62, 14.63; 340/995.12, 995.11
See application file for complete search history.

(56) References Cited

U.S. PATENT DOCUMENTS

| 6,249,913 | B1* | 6/2001 | Galipeau et al. | 725/76 |
| 6,477,152 | B1* | 11/2002 | Hiett | 370/316 |
| 7,769,398 | B2* | 8/2010 | Marston et al. | 455/463 |
| 2002/0160773 | A1* | 10/2002 | Gresham et al. | 455/431 |
| 2012/0232791 | A1* | 9/2012 | Sterkel et al. | 701/454 |

OTHER PUBLICATIONS

Airshow 4200D, Getting There is Half the Fun, RockwellCollins, 2010, 8 pages.
Harris, George J. TGGEEKS, "5 Travel APPS for IPhone to Enjoy Your Adventure" Apps for Travel, dated Jun. 30, 2011, 8 pages.
Georoamer, "Apple Store Summary", ipad.qualityindex.com/games/244748/georoamer, last accessed on Sep. 16, 2013, 3 pages.
Wikipedia, "Google Earth", https://en.wikipedia.org/wiki/Google_Earth, last accessed on Sep. 14, 2013.

(Continued)

*Primary Examiner* — Yonel Beaulieu
(74) *Attorney, Agent, or Firm* — Hickman Palermo Truong Becker Bingham Wong LLP

(57) ABSTRACT

Techniques are described herein for generating a moving map that includes a graphical representation of a vehicle, such as an airplane, and content relevant to a location of the vehicle as the vehicle is in transit. An in-route entertainment server that serves the moving map may be onboard the vehicle or offboard the vehicle. The moving map may display the current location of the vehicle displayed by modifying a delayed location of the vehicle to account for a speed, a heading, and an amount of delay. Content items may be included on the moving map if they are within a bounded region around the location of the vehicle or in the vehicle. Content items may also be included if they are associated with a region that overlaps the bounded region. The bounded region changes as the vehicle moves in transit.

22 Claims, 15 Drawing Sheets

(56) References Cited

OTHER PUBLICATIONS

Wikipedia, "Google Maps", https://en.wikipedia.org/wiki/Google_Maps#2011, last accessed on Sep. 14, 2013, 26 pages.

Hear Planet is a Free Talking Tour Guide for Your iphone, (http://lifehacker.com/5129490/hearplanet-is-afree-talking-tour-guide-for-your-iphone), dated 2013, 2 pages.

Terminal U, "Hidden Journeys: the website that reveals the best views under the flight path", Royal Geographic society's 'Hidden Journeys' website is a useful reference point for the curious flyer., www.terminalu.com/travel-features/hidden-journeys-the-website-that-reveals-the-best-views-under-the-flight-path/14284/, last accessed on Sep. 16, 2013, 7 pages.

Lester, "Explore Audio Augmented Reality with Toozla" Toozla Augmented Reality Audio Browser | Augmented Planet, dated May 27, 2012, 6 pages.

Barry, Keith, "Waze Combines Crowdsourced GPS and *Pac--Man*" Waze Combines Crowdsourced GPS and Pac-Man | Autopia | Wired.com, dated Nov. 16, 2010, 6 pages.

\* cited by examiner

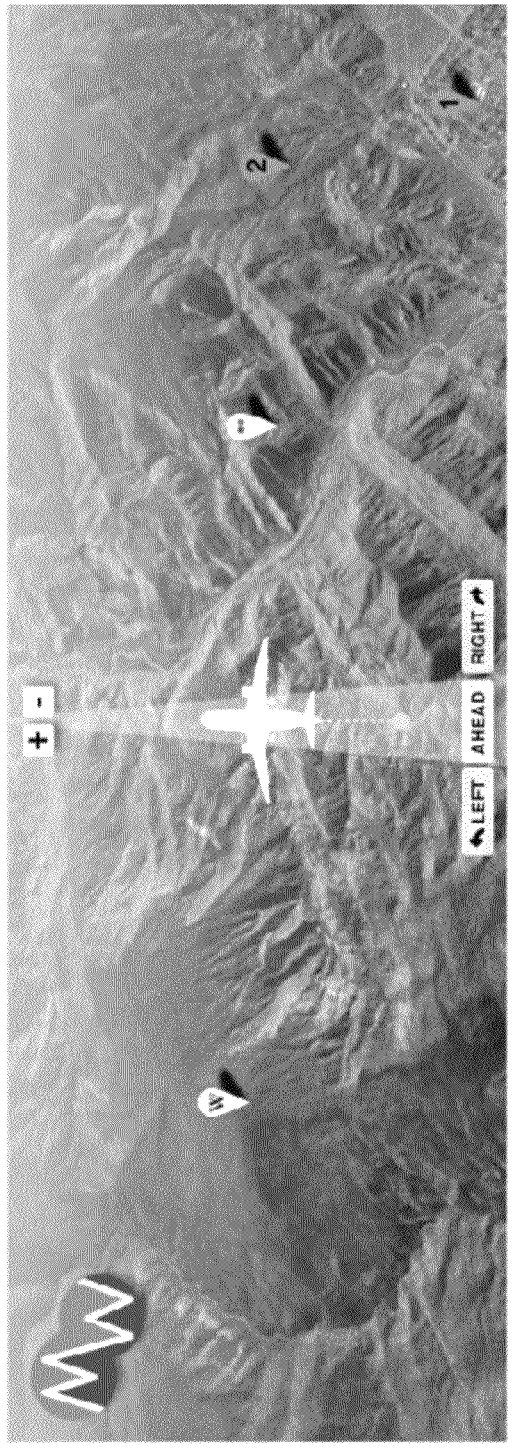
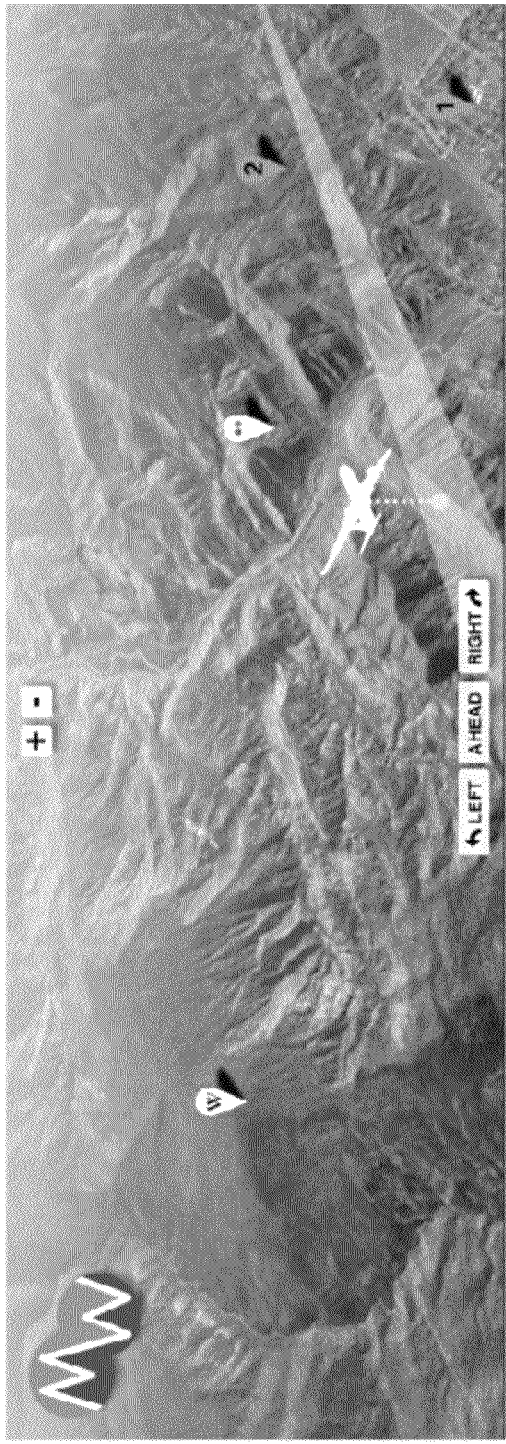
FIG. 4A
FIG. 4B

ONBOARD LOCATION-BASED IN-FLIGHT ENTERTAINMENT AND INFORMATION

CROSS-REFERENCE TO RELATED APPLICATIONS; BENEFIT CLAIM

This application claims the benefit of Provisional Appln. 61/451,097, filed Mar. 9, 2011, the entire contents of which is hereby incorporated by reference as if fully set forth herein, under 35 U.S.C. §119(e). The applicants hereby rescind any disclaimer of claim scope in the parent application and advise the USPTO that the claims in this application may be broader than any claim in the parent application.

This application is related to application Ser. No. 13/412,006, entitled "Location-Based In-Route Entertainment And Information," filed on even date herewith, the entire contents of which is hereby incorporated by reference as if fully set forth herein.

FIELD OF THE INVENTION

The present disclosure relates to the computer-generated presentation, to passengers, of location-based in-flight or in-route entertainment, advertising, and other information.

BACKGROUND

Airline passengers are often confined to a seat in an airplane for a large portion of a flight as they travel from one place to another. Passengers of other forms of transportation may also be confined to the seat of, for example, a train, bus, cab, or other vehicle during the trip. This experience tends to be boring and frustrating, and passengers, such as airline passengers, often attempt to pass the time with entertainment such as in-flight entertainment (IFE). IFE generally refers to media and/or activities that capture the attention of the passenger, and is included in the broader category of in-route entertainment (IRE). IFE and IRE may include newspapers, magazines, or other reading material; movies and video games; and Internet access provided to passengers during a trip. IRE may be provided to train passengers during a train ride, to taxi, limo, or bus passengers during a road trip, or to boat or cruiseline passengers during a water trip.

An example of IRE includes infrastructure-based solutions that include onboard entertainment systems consisting of seatback screens, onboard servers and routers, storage systems, and the software to run them. These entertainment systems sometimes provide movies for the passenger to view or games for the passenger to play. An informational map that shows the current location of the vehicle may also be included. In addition, shopping catalogues may be provided to passengers in the seatback pocket in front of the passenger. Satellite-based content, such as radio or television stations, may also be available to passengers. Current IRE ecosystems might include a blend of legacy infrastructure, overpriced, low quality content, and cumbersome systems. The hardware and the content are expensive, and there are few ways for advertisers to reach passengers.

Internet access is becoming increasingly available on airline flights, and is expected to become more widespread at a decreased cost in the coming years. Other modes of transportation, such as high-speed trains, are also expected to have on-board Internet access. However, flight-specific/location-specific Internet-based in-flight entertainment is not currently available. Therefore, in-flight Internet access is currently used by passengers in a manner consistent with home use.

The real-time location of an Internet user can be determined by determining the location of the Internet Protocol (IP) address that the user is using to connect to a server. The location can be determined on mobile devices (e.g., laptops, smartphones, tablet computers), noting the names (Service Set Identifier or SSID) of nearby WiFi hotspots and querying those names against a database of known hotspot names and locations. On mobile devices equipped with GPS (Global Positioning System) capabilities, the location can also be determined from the coordinates reported by the device's GPS chip. However, these methods of determining location might not be available in a moving vehicle such as a flying aircraft.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

FIG. 4A represents an example user interface with a look-ahead feature in an embodiment.

FIG. 4B represents an example user interface with a directional view feature in an embodiment.

DETAILED DESCRIPTION

Figure 1:
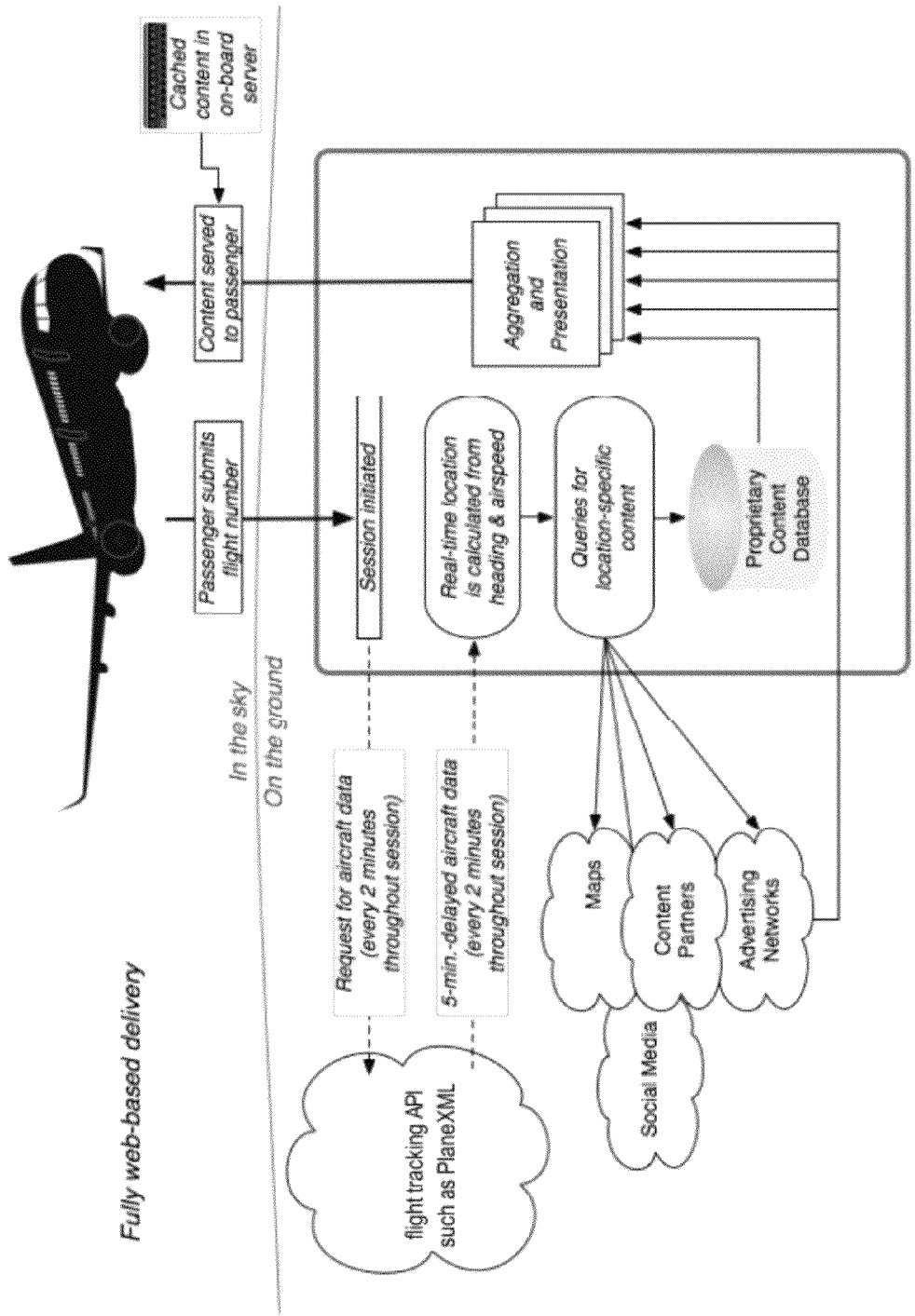
FIG. 1 is a block diagram that represents an example computing system on which an embodiment using web-based delivery may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. While the application discusses embodiments related to airplane travel for clarity, other embodiments may be implemented with any type of travel, commercial or personal. For example, taxi travel and travel by train may be substituted for airplane travel in the examples provided herein. In-flight entertainment may also be substituted with the broader category of in-route entertainment.

General Overview

Passengers of airplanes and other modes of transportation such as bus, car, train, boat, or other passenger vehicle often pass time with many forms of in-route entertainment. In an embodiment, a computing system identifies a vehicle on which a user is traveling, and uses the real-time location of the vehicle as the user's real-time geographic location. Geographically relevant data is then served to the user based on the vehicle's location. Alternatively, a user may view data for an in-transit vehicle even if the user is not onboard the in-transit vehicle. In one example, a user onboard a vehicle may share a trip with a user offboard the vehicle, and both users may follow the vehicle and view geographically relevant data around the vehicle as the vehicle is in-transit from the source to the destination.

Benefits of various techniques described herein may be realized by making, using, selling, offering for sale, or importing special-purpose computing devices or computer-readable media, or helping or encouraging such activities by others. Benefits may also be realized by performing the steps, offering to perform the steps, or helping or encouraging others to perform the steps described herein. In one embodiment, one or more special-purpose computing devices perform a method for determining a vehicle's changing geographic location and presenting, on or otherwise concurrently with a moving map, content that is relevant to the changing geographic location. In another embodiment, instructions are stored on one or more non-transitory computer-readable storage media, and the instructions, when executed by one or more computer processors, cause determining a vehicle's changing geographic location and presenting, on a moving map, content that is relevant to the changing geographic location. In yet another embodiment, one or more computing devices are specially configured to determine a vehicle's changing geographic location and present, on a moving map, content that is relevant to the changing geographic location.

In one embodiment, a user connects, via a user interface, to server moving map engine that is onboard the vehicle, offboard the vehicle, on the user's device or on a different device, or a combination thereof, and implemented in hardware logic such as electronic circuitry, software logic such as stored instructions, or a combination thereof. The user inputs the user's trip information into the user interface. The trip information may include carrier-identifying information and vehicle-identifying information such as, for example, an airline name and a flight number. In the same or a different embodiment, the moving map engine may retrieve the user's trip information from a travel management system. For example, the user may provide, to the moving map engine, the user's authentication information for the travel management system, and the moving map engine may use the authentication information to retrieve trip information about a trip on which the user is currently traveling.

In one embodiment, the moving map engine receives user travel information that indicates a vehicle or path on which a user is traveling. Based at least in part on the user travel information, the moving map engine determines a location of the vehicle as the vehicle is in transit. The moving map engine then determines which digital content items relate to a bounded region that includes the location. For example, the moving map engine may determine the size of the bounded region based on a default zoom level or a zoom level set by the user. The digital content items relating to the bounded region may include those content items that are associated with locations that are within the bounded region, and/or those content items that are associated with regions that overlap the bounded region.

The moving map engine generates a map view that covers the bounded region and may include a graphical representation of the user's vehicle at the location of the vehicle on the map. In one embodiment, the displayed map region is centered around or otherwise based on the location of the vehicle, but the vehicle itself is not depicted on the map view. The map view also includes graphical representation(s) of content item(s) that relate to the bounded region. The content item(s) represented in the view may be a subset of the content item(s) that relate to the bounded region covered by the view. The moving map engine may update the map view to cover different bounded regions as the vehicle in transit moves from one location to another. The moving map engine determines different sets of digital content items that describe content that relates to the different bounded regions, and the different sets of digital content items are presented on the updated map views. In one embodiment, the vehicle in transit is displayed on the moving map as moving smoothly between overlapping regions that include some of the same content items and some different content items.

In one embodiment, the server receives a user selection of a content item's graphical representation, as displayed on a moving map interface. For example, the user may select an item by touching the item on a touch-screen, or by clicking or hovering over the item with a mouse. In response to the user selection, the server causes information to be displayed. The server logic for causing the information to be retrieved and displayed may be included on one machine or more machines. A single machine configured to run in a specialized environment, such as a client-side machine configured to be connected to server(s) or a server-side machine configured to be connected to client(s), may be said to cause a result even if the single machine does not carry out every step for achieving that result. For example, server logic running on the client machine may use an identity of the selected item to query another machine that is onboard or offboard the vehicle, and utilize the results of the query to display additional information. Also, logic running on the other machine may acquire or retrieve requested content from storage on the other machine or from various network-connected storage locations. The retrieved content may then be returned to the client machine, for display to the user. The additional information may be added to the map view or may be displayed, concurrently or non-concurrently with the map view, in a separate window. For example, selection of a pin may cause display of the name of the pin, a summary of information described by content item(s) represented by the pin, partial content from the content item(s) represented by the pin, or full content of the content item(s) represented by the pin. Selection of the pin may also run one or more programs. The additional information may also be provided in non-display formats such as audio. For example, selection of the pin may trigger playing an audio clip related to a location that was marked by the pin.

In one embodiment, the moving map engine determines that a vehicle has moved from one location to another as the vehicle is in transit on a trip from a departure or source location to an arrival or destination location. In one example, to determine a current location of the vehicle in transit, the moving map engine receives a delayed location, a heading, and/or a speed of the vehicle from a vehicle information server, and the moving map engine predicts the current location of the vehicle based on the delayed location, the heading, the speed, and/or the path of the vehicle. For example, the moving map engine may determine or estimate that the delayed location is stale by five minutes (i.e., a five minute time delay). For example, the information received may be timestamped to indicate a delay, or the moving map engine may be configured to expect an average or expected delay from the vehicle information server. The moving map engine may estimate the current position of the vehicle by adding, to the current location, a distance based on a multiplicative combination of the time delay and the speed of the vehicle. In another embodiment, the moving map engine may estimate the current position of the vehicle by predicting a progress of the vehicle along a trip plan that may be based on the delayed position, a predicted or actual heading of the vehicle, and/or a predicted or actual speed of the vehicle. If the vehicle was last reported to be on schedule along the predicted path, then the moving map engine may predict that the vehicle is still on schedule along the predicted path.

Example forms of content items include, but are not limited to: pictures, comments, texts, videos, songs or sound files, Web sites, articles, games, social networking content, and/or advertising content. A single moving map view may include different forms of content items, and different forms of content items may enter or leave the view as the vehicle moves from location to location. In one embodiment, the content items presented on the moving map view are selected from user-generated content items. The user-generated content items may have been generated by the user viewing the moving map, by other users of the IRE system, or by members of the public or members of other content-sharing sites. For example, the content items may have been uploaded to a social networking service or authored by friends of the user who is viewing the moving map. As another example, the content items may have been uploaded to a content sharing service or authored by users who have shared content with the general public. The user-generated content items may be tagged or semantically associated with a location or a region, and the location or the region may be used to determine whether or not the content items should be displayed on a current moving map view or associated content displays.

In various embodiments, content items may be stored in association with locations, regions, destinations, the aircraft, or the surrounding airspace. In one example, content items are stored in association with a region as a whole and not any particular point within the region. For example, a user adding the content item via an interface to a content management system may choose among several regions that have already been defined, such as state and county regions, or may create a new region by drawing a polygon on the map or otherwise specifying the points of a polygon. As the plane moves from bounded region to bounded region, the moving map engine may determine that the bounded region covered by the current moving map view overlaps with one of the points and/or regions associated with content. In response to determining that the current view overlaps with one of the regions associated with the stored content, the moving map engine may add, to the moving map view, the content associated with the region. The boundary or partial boundary of the region may be displayed on the moving map, a marker may be displayed somewhere within the region, and/or a name or other information about the region may be displayed in a sidebar next to, above, below, or on top of the map. Bounded regions covered by the moving map at different times during a trip and/or different bounded regions defined in association with content items may overlap with each other.

In one embodiment, when markers are displayed on the moving map, a user may hover over, touch, or otherwise select the markers to trigger display, on a client device, of additional information on, above, or to the side of the moving map. For example, the user may touch (on a touch-screen display) or hover over (using a mouse) a marker to trigger the client device to display the name and/or a summary of the content item represented by the marker. The user may further select the marker, the name, or the summary information to trigger display, by the client device, of the content item. For example, when the moving map engine detects that the user has touched or clicked on the marker, the moving map engine may cause display of a partial or full picture, comment, text, video, song or sound file, Web site, article, game, social networking content, and/or advertising content. In one embodiment, a first touch causes display of name or summary information, and a second touch causes display of the content item. By selecting markers presented around the vehicle, and reviewing the displayed content, a user may discover information about the surrounding region or other information as the user travels through the region to his or her destination.

In one embodiment, game pieces are displayed around a location of the vehicle as the vehicle is in transit. The user may receive game credits, points, or power-ups for picking up the game pieces, and the user may be ranked among multiple users based on the credits, points, or power-ups. The credits may be used by the user to purchase items online, at the airport or transit station, or on the vehicle itself. In other words, the user may pick up a virtual coin and spend the virtual coin to purchase real items from a vendor that honors the virtual coins. The tokens may be placed randomly, or the tokens may be placed on or near landmarks, stores, golf courses, rivers, or cities. The power-ups may be used by the user to enhance a character or game environment that is managed by the user. For example, the user may pick up a new sword or gun, a new shield or armor, or a power boost for the user's virtual character.

In one embodiment, code sent from the server to the client, evaluated by a browser on the client device, triggers display of the additional information on the client device. If the client device has not pre-loaded the additional information, the client device may request the additional information from the server before the additional information is displayed.

Retrieving Vehicle Information from a Vehicle Information Server

In one embodiment, while a vehicle is in transit, a user accesses an moving map engine via one or more mobile devices, such as mobile phones, PDAs, laptops, tablets, computers built-in to the vehicle, or any other computing device accessible to the user during the trip. For example, the user may turn on his or her device and access a Web page after a plane has reached 10,000 feet. If Internet access is available on the flight, the user may pay for Internet access from services such as Gogo Inflight Internet, or Internet access may be free through the airline or plane owner, through a flight reservation or booking service, or as part of another promotional service. The user may access the moving map engine without Internet access if the user has wired or wireless network access, Bluetooth access directly to a moving map engine server or intermediate device, or some other connection to the moving map engine.

In one embodiment, the user accesses the moving map engine by entering a Uniform Resource Locator (URL) in a browser, by selecting a link, or by running an application that automatically connects to the moving map engine. In one embodiment, the address of the moving map engine is a network address, and the user's request is directed to a server device at the network address by network devices offboard the plane. In another embodiment, the address of the moving map engine is a local address, and the user's request is directed to a server device at the network address by network devices onboard the plane. For example, the user's device may be connected to a local area network on the plane for accessing media and other content that is provided as a service by the airline.

The user's device displays a cached or newly retrieved version of the interface to the IRE system. The interface may include several options, one of which is to follow the user's vehicle on a moving map. In one embodiment, when the user selects the option, the user is prompted to insert a vehicle passenger-service carrier name, vehicle number, departure location, destination location, tail number, license plate, user information, or other information that can be used to identify the user's vehicle. For example, the departure location and destination location can be combined with the current time to guess the identity of the user's vehicle. Upon receiving the information identifying the vehicle, the moving map engine causes the user's device to display a moving map of the user's vehicle by generating map tiles around the current location of the vehicle. In another embodiment, when the user selects the option to follow the user's vehicle on a moving map, the vehicle information, such as the vehicle passenger service carrier name and vehicle number, is determined automatically by the moving map engine, without prompting the user to identify the vehicle. For example, if the user is accessing an onboard moving map engine via a local network, the moving map engine may presume that the user is on the same vehicle as a machine running the moving map engine. As another example, the moving map engine, whether onboard or offboard, may associate a network address or range of addresses with a particular vehicle. The moving map engine may also guess the user's vehicle based on other users who are already logged into the moving map engine from the same plane, using the same range of network address(es), or the same onboard server(s) or network device(s). For example, the moving map engine may have information about which Internet Service Provider device(s) are installed on the plane, and may guess the user's vehicle based on this information. In one embodiment, the moving map engine displays a moving map for a random vehicle. The user may be presented with an option to correct the vehicle information that was guessed by the moving map engine.

In one embodiment, the moving map engine may display an interface that allows the user to identify or distinguish the vehicle by specifying a variety of optional characteristics. For example, the user may input the airline name, the departure city or airport, the arrival city or airport, the boarding time, the departure time, or the arrival time. Alternately, the user may enter authentication information to a trip booking or trip management system such as an airline managed booking system, TripIt, or Kayak. In one embodiment, the user may be prompted with a series of questions until the moving map engine can make a determination as to which vehicle the user is on. The available answers to the questions may be restricted based on answers to previous questions. For example, a user who has indicated he or she is traveling from LAX would not need to see options that could identify flights from other airports.

Vehicle information, such as the location, direction, and/or speed of the vehicle, may be retrieved from a vehicle information server either onboard the vehicle or offboard via a network connection. There are a number of publicly available sources that provide near-real-time aircraft location data over the network. For example, the United States Federal Aviation Administration (FAA) makes aircraft positional data available to the public via a network-connected server. There are also several third-party companies that package aircraft positional data, from the FAA or otherwise, into application programming interfaces (APIs) for convenient use by developers. For example, Flightwise, Flightstats, and Flightaware provide APIs for querying flight location, speed, and/or heading. In a particular example, the Flightwise interface receives a flight number and outputs a geographic location, an altitude, a speed, an origin, a destination, a type of plane, and the airline name.

Various embodiments may use other available APIs to determine the real-time geographic location of a particular airplane in the skies. Vehicle information servers provide vehicle information throughout the world by providing access to vehicle information databases. For planes in the FAA airspace, including U.S., Canada, Mexico, Caribbean, Hawaii, and Alaska, data generally originates from the FAA. Flight information may be gathered from Automatic Dependent Surveillance-Broadcast (ADS-B) as part of the Next Generation Air Transportation System for Europe. ADS-B is based on GPS and radars rather than radars and radios as in U.S. In Europe, ADS-B aggregators package up the air traffic control data. Vehicle information servers also exist for other types of transportation, such as train, plane, boat, or automobile transportation. Therefore, embodiments may be used in any country and for any type of transportation for which location information is available.

The vehicle information server may also be on the vehicle. For example, a plane may include one or more computing devices that run a vehicle information server. The vehicle information server may provide the current location, speed, and/or heading of the vehicle based on, for example, a reading from measurement or tracking devices that are also on the vehicle. For example, an ARINC 429 system may be queried for flight location information. ARINC 429 is a standard protocol for reporting information on a plane. The ARINC 429 system can be used to retrieve information about fuel levels, position, weather, temperature, altitude, how full the lavatories are, how empty the water tanks are, or other information retrieved from the aircraft's systems. However, an onboard system could use any communication technique for retrieving measurements from onboard devices.

If the vehicle information server and the moving map engine are both on the plane, the moving map engine may serve a moving map and content to users on the plane without using a network connection to pull information from offboard the plane. The moving map engine may store map tiles or map information associated with various locations or regions, and map content associated with various locations or regions. When a user requests display of a moving map with content, the moving map engine may determine the vehicle's location from onboard equipment, pull the moving map and content from onboard storage, and display the moving map along with relevant content. Optionally, if the onboard server also has access to a network for connecting to offboard servers, the onboard server may supplement map information and relevant content with other map information or relevant content that is pulled from the offboard servers. However, such network access is not required for the onboard embodiment.

In an embodiment, a query is sent, by query sending logic, such as stored instructions, on a computing device with access to the travel identifier information and/or vehicle-specific information, to any one of several APIs to gather data about the vehicle, including location data. These requests may use technology such as representational state transfer (REST) requests to an API server. Such requests may occur at regular intervals, such as once every minute during the end-user's session. Alternatively, each request may be initiated by the end user in order to conserve bandwidth.

In one embodiment, in response to a request that identifies a flight, the API server returns flight information. This flight information may be delayed. In an embodiment, the flight information is returned using JavaScript Object Notation (JSON) technology, which provides information in an expected format. A computing device's parsing logic can parse the received information based on the expected format, such as JSON data, to extract data points about the aircraft's position information, bearing, speed, and altitude.

In an embodiment, the client (i.e., the end-user's web browser or other computer program on a user's device), sends a request, such as a JavaScript request or other Internet-based request, for updated vehicle information to the server at regular intervals, such as every 5 seconds. This data is used to continuously update the vehicle's position.

Predicting Real-Time Position Based on Delayed Vehicle Information

Position information may not be real-time in an embodiment. In an embodiment, location approximation logic approximates the real-time position information based on the most recent or last retrieved API data (such as 5-minute old data) by applying a mathematical formula to the last batch of data points or last few (such as 3) batches of data points. In one embodiment, each "batch" of vehicle data contains position, bearing, speed, and altitude data. Speed data may be expressly specified in the vehicle data, as a separate data point, or may be estimated based on the last few retrieved positions. In one embodiment, approximation logic approximates a current position of the vehicle by evaluating the time the vehicle took to cover the last 3 reported points on its path or route, and then extrapolates the real-time position (i.e., 5 minutes ahead of the last reported point on the path).

In one embodiment, the current position is estimated by modifying the last reported position by a multiplicative combination of the last reported speed and the estimated amount of time that the last reported position is delayed. The current position may be updated based on the speed and heading or expected heading (for example, from a flight plan or other travel route) such that the vehicle moves smoothly along a moving map even if the position is retrieved at a much slower rate than the refresh rate of the moving map. For example, the vehicle may move every few seconds or milliseconds on the map, and the delayed position may be retrieved every few minutes.

In one example, approximation logic assumes that the vehicle has continued in the same direction at the same speed, and then approximates the current location based on this information. In another example, approximation logic assumes that the vehicle took an expected route or flight path from a departure city to an arrival city. In yet another example, the approximation logic provides different weights to different factors, such as reported positions, estimated or reported speeds and bearings, and an expected route or flight path. For example, if the vehicle is well off of the expected route or flight path, the route information may be given little or no weight when predicting a current location of the plane. On the other hand, if the vehicle is closely following the expected route or flight path, the route information may be given more weight when predicting a current location of the vehicle.

Generating a Map View that Includes the Vehicle's Location

In one embodiment, the vehicle's position is graphically represented on a front-end moving map interface in a browser. For example, if an airplane is flying over San Jose, Calif., then a map of San Jose and the surrounding area may be presented to the user, with a picture of an airplane or other representation superimposed on the map to indicate the in-flight location of that airplane on the map of the San Jose area. The map may be viewed at an angle or from directly above, and/or the map may be warped based on elevation data or other data. In another example, if the vehicle is a car, a bus, or a boat, a picture of a car, a bus, or a boat may appear on the map.

In one embodiment, updated vehicle data retrieved from a vehicle information server is used to reposition the icon or other visual representation of the vehicle on the user interface map, denoting the real-time or approximate real-time location of the vehicle. In one embodiment, the location of the vehicle remains in the center of the map, and the map moves as the vehicle changes location. A user interface may display the map view along with the vehicle's elapsed travel time since departure, remaining time until arrival, and/or approximate real-time altitude, and this information may also be updated as the updated information becomes available from the vehicle information server.

Map elements (such as "tiles") may be loaded from a third-party provider of digital map data based on the location data. In one embodiment, the map tiles may be tiles that are retrieved from a mapping service that provides satellite imagery, road map, or any other geolocated information for a region that includes the plane's location or predicted location. In one embodiment, map tiles are stored on an onboard server, and the map tiles are retrieved from the onboard server as needed. The zoom-level of the map may be user-defined, set to a default zoom level, or set to an initial zoom level that is determined based on how many digital content items are associated with each of a set of potential zoom levels.

In one embodiment, the moving map engine stores map tiles received from the mapping service and transforms the map tiles for display in the browser to create a simulated oblique or tilted view. In one embodiment, the moving map engine stores elevation information for each location (i.e., a digital elevation model), and the tiles are warped based on the elevation of each portion of the tiles, creating a 3D surface. The warping or elevation scaling may be based on the zoom-level, such that latitudinal and longitudinal scaling is the same as the elevation scaling. In one embodiment, the moving map engine adds an overhead haze above the map to give perspective to the oblique view. In one embodiment, the moving map engine causes the map view to be drawn by the browser in a canvas element of HTML5. For example, JavaScript code may be executed to draw and redraw the terrain, roads, buildings, political boundaries, and/or other map features as the vehicle moves from region to region. In various other embodiments, the map may be drawn using Flash, Silverlight, or using other software technologies. The map may be zoomable, and may support panning, swooping, and/or dragging. The interface may include a home button or link that, when selected, causes the map to snap back to location of the vehicle, optionally with the vehicle in the center, in case the user has panned to regions that do not include the vehicle.

In one embodiment, the moving map engine pre-loads tiles ahead of the vehicle based on the heading, speed, and/or route of the vehicle. For example, the moving map engine may pre-load tiles around the viewable region such that the user may quickly pan in any direction or zoom out. The moving map engine may pre-load tiles ahead of the vehicle such that the tiles may be displayed without delay as the vehicle moves along the expected path. In one embodiment, extra tiles are pre-loaded ahead of the vehicle rather than behind or beside the vehicle. In another embodiment, the moving map engine pre-loads only those tiles that are ahead of the vehicle along the expected path.

Graphically Indicating Content Items in the Map View

The moving map engine causes display, on a map view displayed to a user in a browser, of graphical indications of content items associated with the location of the vehicle. A list of candidate content items may be stored on the moving map engine, along with, for each content item, a location or region of the content item and an indication where the content item is stored. For example, the content item may be stored on a device that is onboard the vehicle, such as on a server running the moving map engine, or a device that is offboard the vehicle. Other candidate content items may be drawn from social networking sites such as Facebook or Twitter.

In one embodiment, the moving map engine causes display, on the map view, of graphical indications of content items associated with locations that fit within a bounding box or boundary region of a map view. In the same or a different embodiment, the moving map engine causes display, on the map view, of graphical indications of content items associated with regions that overlap or partially overlap the boundary region of the map view. In one example, the boundary region is the area surrounding the current location of the vehicle, such as an area within a specified distance of the vehicle or within a specified boundary around the vehicle. Content items may be marked on the map view if the content items are associated with a region that juts into the boundary region, or is included within the boundary region. Content items may also be marked on the map view if the content items are associated with a point location that falls within the boundary region.

In one embodiment, marked content items are those content items that are associated with locations that fit within a bounding rectangle or bounding radius around a point, such as the plane's location, on a map view. The size of the bounding region relative to the earth's surface may be determined based in part on the zoom-level. For example, zoomed out views cover more land area than zoomed-in views. Graphical indications of content items, such as content markers, are displayed on the map interface to denote a content item associated with a location that is within the map boundaries. Content items may be related to specific geographical points on the ground ("point content"), as defined by latitude and longitude coordinates. In an embodiment, content items may be considered "regional content" that is defined by a series of points that define a polygon or a line in geographic space. Point content is displayed as markers on the map interface, while regional content appears in the interface during the entire time that the user's vehicle is within a particular region polygon defined in our server in an embodiment.

In one embodiment, panning a map from one region to another region may cause content pins to be loaded as the map is dragged. The map may be dragged beyond threshold distances from the vehicle, even beyond distances for which content has been pre-loaded.

In one embodiment, the moving map engine removes pins that are less popular, less frequently viewed or liked, or not as highly rated as other pins. The moving map engine may remove pins such that a minimum distance between pins is maintained or such that a maximum number of pins are displayed on the screen. The moving map engine may also remove pins such that undesirable or unpopular items are not frequently displayed to users. Content may also be filtered from the map view if the user has personally given the content a low rating or has indicated that the user has viewed the content and does not wish to re-view the content. For example, the user may have already perused an article and would not learn anything by perusing the article again. As another example, content in a same category that the user has previously viewed may be given a higher priority for view than content in categories that have been presented to the user but were not the target of user interaction. Items with higher priority may be displayed instead of items with lower priority if there are too many items to display on the map view.

In one embodiment, the graphical indications are interactive markers or pins. An interactive marker or pin may appear generically with respect to other markers or pins, or may be distinguished from other markers or pins based on the category, topic, type, or source of the content. In one embodiment, the marker or pin is a logo that is color-coded and/or shaped based on category, topic, type, or source. Example categories include, but are not limited to: points of interest (for example, content associated with a point on the ground), regional content (for example, content associated with a set of points, a region, a shape, or within a radius of a point on the ground), destination content (for example, content associated with the passenger's destination or aircraft's destination), content having to do with the vehicle (for example, information about the plane or airline, the age of plane, seat information, or pilot information), content having to do with the atmosphere or airspace around the vehicle (for example, information about the air, the atmosphere, the weather, the stars, other planes or vehicles, the jetstream, or turbulence that may be relevant to the flight). Example topics of content include, but are not limited to: civil war content, architectural content, bridges, road information, movie sites, stadiums, parks, or golf courses. Example types of content include, but are not limited to: pictures, comments, texts, videos, songs or sound files, Web sites, articles, games, social networking content, and/or advertising content.

When a user hovers over or makes a preliminary selection of the marker, the moving map engine may cause display of a name or summary of the content item represented by the marker. When a user touches, clicks on, or selects the content item, the moving map engine may cause display of additional information about the content item, or part or all of the content item itself. The name information may be stored locally by the moving map engine, in a database that includes content item names, geographical locations, and storage locations, and the content item itself may be retrieved from a content server identified by the storage location for the content item. The name information may be sent to the browser client in association with marker locations of content items that may be displayed on the map view by the browser client.

For example, users may select a content marker to see a name or summary of the content, and further select the content marker to retrieve the content associated with the marker. Content may be original content uploaded by other users of the moving map system, or may be content gathered from external sources such as social networking services or other content sharing services. For example, photo content may be gathered from photo-sharing sites like Flickr. Informational content may be gathered from Wikipedia. In an embodiment, users may select which sources of content they wish to have displayed on the map.

In one embodiment, user-selection of the marker causes the content to be loaded above, below, next to, or on a layer on top of the moving map. User-selection of the marker may also cause an application to load customized content. The content may be displayed in the same window as the moving map or in another window. In one example, the content is displayed on a sidebar or in a frame above or below the moving map. In another example, the content appears in a popup window next to the marker.

In one embodiment, the moving map engine shifts map tiles and content markers in the map view as the vehicle changes position. A vehicle icon may remain in a fixed position, and movement of the underlying map and content items may convey a sense of continuous movement. As the map interface moves, the client sends requests (such as JavaScript requests) for new map tiles and content for the newly displayed portion of the map. In response to the client requests, the moving map engine retrieves the new map tiles and new content pins and names. Content items and map tiles may be pre-loaded on the browser client before the content items and map tiles are included in the region covered by the map view. In this manner, the client may have the information available to support smooth movement of the vehicle with respect to the map and/or panning away from the vehicle on the map view.

Discovering Content

In one embodiment, a content discovery engine crawls sites such as Wikipedia, Flickr, Facebook, Google Plus, LinkedIn, Gowalla, and/or Foursquare to harvest information about posts on the sources. Content may be retrieved if the content is geotagged, if the content is shared to the public, if the content is highly rated or frequently viewed, and/or if the content is hash tagged or marked with keywords as content that is viewable from the sky. For example, the content may be tagged as #MondoWindow content. As another example, the content may be associated with a comment, "great view." The content discovery engine may continually crawl these sites, creating a file or files and associated geotags. The file may be used to generate pins on a map view. The file may also include summary information or other information that should be cached for display before the user has decided to view the content from the source.

Social Networking Content

In one embodiment, the moving map application runs inside of a social networking application such as Facebook. In another embodiment, the moving map application invokes a Facebook integration application that pulls content from Facebook and displays the content on the moving map. In either embodiment, the user may be asked to login to Facebook so that content specific to the user may be displayed on the moving map. In one example, the moving map application may use information about friends of the user to enrich the moving map experience. Posts of friends may be displayed in association with a geographical location of the posts, or in association with a current geographical location or a home geographical location of the user who submitted the post.

In one embodiment, the user can initiate, from within the moving map application, posts to the social networking application. The posts can be associated with the current position of the plane. For example, the user can check into a region when the plane flies over the region, or the user can give a shout out to other users from above the region. In one embodiment, the user can allow other users of the social networking environment to follow the user along the user's trip. The moving map application may trigger status updates as the user moves along the route, passing through different regions. The user may customize when the status updates should be provided and when the status updates should not be provided.

In one embodiment, the moving map application posts a dynamic status update that changes as the user moves through a region. For example, the moving map application may post a first status update when the user passes through Indiana, a second status update when the user passes through Illinois, and a third status update as the user passes through Missouri. The posts may be automatically generated by the moving map application, or may be generated or modified by the user. In order to avoid flooding the user's friends with the minute-by-minute details of the user's trip, the moving map application may delete one post generated for the user's trip before or in response to posting another update for the user's trip. Other users will only see the most recent post. In one embodiment, a post is not deleted if other content has been added by other users in response to the post. For example, the moving map application may retain trip update posts when other users have commented on the trip update posts. A post of "flying over Indiana," for example, may have received the comment "we waved to you!" from a friend of the posting user. The moving map application may retain this post, but delete other posts that did not receive comments such as "flying over Illinois" and "flying over Missouri."

Facebook can be used as the authentication mechanism for moving map users such that a Facebook account uniquely identifies a user of the moving map application. Other services, such as TripIt or airlines' frequent flyer systems, may also provide an authentication mechanism for uniquely identifying a user.

In one embodiment, when a user identifies a vehicle that the user is on, the moving map application may trigger a post to a social networking site with a link to the moving map application. An example post is: "I have just boarded Southwest Flight 100 to L.A. See where I am at now on Mondo Window," where the word "MondoWindow" is a link to the moving map application interface for Southwest Flight 100.

Other users may click on the moving map application to see the status and route for the trip.

In one embodiment, users of the moving map application may share status updates with each other via messages, posts, or notifications, viewable either through the social networking application or through the moving map application.

In one embodiment, a checkin to a road trip, bus trip, train trip, boat trip, plane trip, or any other trip may cause rolling status updates based on the path or itinerary of the moving person or moving vehicle. A single post may be periodically modified, replaced, or updated such that the expected location of the user on the trip is updated to other users of a social networking site. The single post may be updated based on information retrieved from a location tracking mechanism associated with the user's post, such as a plane tracking mechanism or a GPS device. For example, a comment on Facebook may be added by a social networking engine to describe a current location of a moving vehicle on which a Facebook user is traveling. The comment may be deleted and replaced, or otherwise modified with a new comment periodically, such as every 30 minutes. The new comment provides an updated location of the moving vehicle, and updates may continue throughout the trip, and even ending with an indication that the trip has ended and the Facebook user has arrived at his destination. These settings may be configurable by the Facebook user if the Facebook user requests that the social networking engine add such dynamic posts to the social networking site.

In one embodiment, a user may be associated with a changing location even if the user is not traveling in a known vehicle or even any vehicle at all. The GPS mechanism on a mobile phone of the user may be used to determine updated locations of the user as the user travels on a journey, regardless of how the user is traveling. A moving map view may be provided to the user or to others even if the user is just strolling down the sidewalk. If the user is on a sidewalk or street, the moving map view may include a street view if such view is available from street view service providers such as Bing or Google. The social networking status of the user may be updated periodically or according to user-defined settings even if the user's trip includes biking or walking to a train, and continuing the journey on the train. The social networking engine may receive periodic updates from a client engine running on the user's mobile device.

Rating Content

Pins may be rated based on viewability from the air or from within the vehicle, enjoyability to visit, general likeability of the underlying content, etc. Content ratings may be used for selecting content that the user may like. Content with similar characteristics to liked content by the user may be displayed to the user. Content with dissimilar characteristics may be hidden. Ratings may provide information about a category of items in which the user is interested, and/or the user may expressly indicate an interest in a category of items.

The user may rate the content as the pin name, content summary, or full or partial content is presented to the user. For example, an option to rate the content may be displayed on a user interface concurrently with the content itself. In a particular example, a user may give a photo one, two, three, four, or five stars as the user is viewing the photo.

An aggregate of user content ratings may be displayed with the pin on the moving map or with the summary as the user is hovering over the pin. The user may see that a given pin is highly rated and determine to click on the pin. Alternatively, the user may see that the given pin is lowly rated and determine not to click on the pin. The pin may also be colored or sized based on the rating or the expected desirability of the content to the user.

Content Management System

In one embodiment, a content management server provides a content management interface, to users, for uploading new content for display in the moving map system. New content may be uploaded or referenced in association with a location, region, destination, aircraft, or airspace. For example, the content may be tagged with a geographic point location, or a geographic region to which the content relates.

In one embodiment, a user interacts with the content management interface to input a new content item. The content management interface prompts the user for a location or region for the content item. The user may select from a set of existing locations or regions, or the user may define a new location or region. If the user defines a new location, the user specifies geographic coordinates that are relevant to the content item. The geographic coordinates may be manually specified, or the geographic coordinates may be automatically generated based on a user selection of a location on a map. If the user defines a new region, the user specifies geographic coordinates of a polygon or shape that is relevant to the content item. The polygon may include several geographic coordinates that are manually specified or automatically generated based on a user selection of points on a map. For example, the user may draw a shape on the map. Points and regions may be given a name that is shared by or different from the content provided for the region or point.

In one embodiment, the Content Management System (CMS) stores information gathered from public sources and/or information that was uploaded by users directly into the CMS for sharing with other users of the moving map system. If such content is stored onboard the plane, the content may appear on the moving map in online or offline mode.

In one embodiment, the stored content is organized by type, such as region content, point content, destination content, vehicle or aircraft content, and/or airspace content. For example, for Iowa region content, passengers interacting with the MondoWindow application may receive a notification or display of an item of information in a sidebar when entering or exiting the region of Iowa. Content may be associated with an event, and the event may be associated with a start time, an end time, a duration, and/or a single time.

In one embodiment, the stored content includes destination content. For example, the author of the content may desire that the content is shared with users who are traveling to a certain destination. For example, users traveling to Los Angeles may be encouraged to dine at a particular restaurant or visit a certain attraction during their stay in the city. This type of destination content could include advertisements, coupons, or special offers aimed at the traveler. As another example, users traveling to L.A. or Hawaii may be encouraged to travel to Las Vegas. In this manner, the content may be associated with a particular destination airport even though the content is about a different region or destination airport. Content may also be provided for a region when the vehicle passes within a threshold distance of the region.

In another example, for a plane flying within a threshold distance of Las Vegas, the passengers on the plane that are interacting with the moving map may receive an advertisement that is based on the arrival city, the departure city, and/or the city or region they are passing in the air. For example, an advertisement for a passenger headed to Hawaii and passing by Las Vegas could say "Why spend 4 more hours on the plane to get to an island when you can lounge on the beach at your hotel in Vegas?" The content could point out to passengers that similar services and environments are available in other cities that are closer to the passenger's departure city or home city.

In one embodiment, displayed content may be limited to that content which is publicly available and can be stored and used without additional waivers of rights. In another embodiment, displayed content may include content for which additional waivers of rights have been made by an author interacting with a content manager.

Content may be boosted in rating with an indication that the content is paid advertising content. Paid advertising content may cause the moving map provider and/or the user to be credited, and the advertiser debited, when the content is displayed, hovered over, and/or selected by the user.

Example of Serving Content from an Offboard Server

In an embodiment, the end-user connects to a network such as a wireless network on the vehicle using any network-enabled device that can run web browser software. Any technology may be used to supply Internet connectivity to the aircraft, such as ground-based antennas or satellites. The end-user inputs their vehicle identifying information into a form on a Web page or in an application ("app") on a device, such as an iPhone-based device, an Android-based device, a Windows-based device, or any other smartphone. Optionally, the end-user may input only part of the information about their trip, and the system may guess the rest of the information based on the discrete set of trips that are in transit. The system will match the inputted travel information "travel identifier(s)" with a database of travel information to determine the current vehicle number or other vehicle-specific information. In an embodiment, the determination is based on the time of day in the origin city.

FIG. 1 is a diagram illustrating an example of a way in which data flows to the in-flight passenger without any interaction with the airline's equipment or a firm that provides in-flight connectivity to an airline's equipment other than simply processing the internet traffic to and from the plane. In an embodiment, a passenger submits a flight number or other travel identifier. This causes a session with a server to be initiated. The server requests flight tracking data at regular intervals. The real-time location of the airplane is calculated from heading and airspeed information received as location data. Based on the location, the server requests location-specific content information from content servers, including third-party content servers and proprietary content servers. Content is aggregated with advertising information and location information, and the aggregated data is used to generate a map with location and content identifiers. The map is then presented to the user on a client device such as a tablet, a laptop, or a mobile phone.

Figure 6:
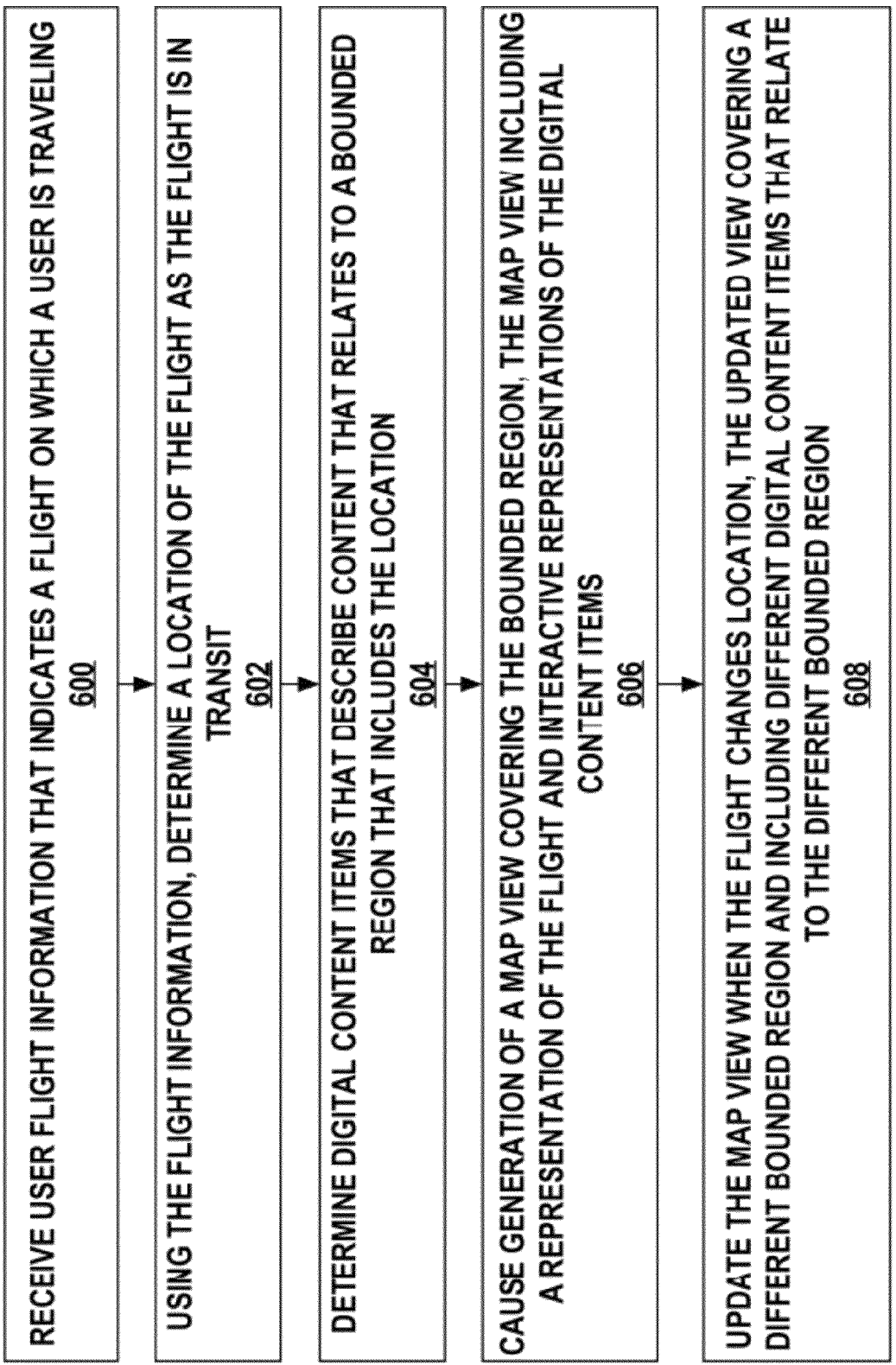
FIG. 6 is a diagram illustrating a process for causing display of a moving map with interactive representations of content items.

FIG. 6 is a diagram illustrating a process for causing display of a moving map with interactive representations of content items. The process includes, in step 600, receiving user flight information that indicates a flight on which a user is traveling. In step 602, the process includes using the flight information to determine a location of the flight as the flight is in transit. In step 604, the process includes determining digital content items that describe content that relates to a bounded region that includes the location. The process causes generation of a map view covering the bounded region in step 606. The map view includes a representation of the flight and interactive representations of the digital content items. The interactive representations are selectable to display more information about the content items. In step 608, the process includes updating the map view when the flight changes location. The updated view covers a different bounded region and includes different digital content items that relate to the different bounded region. The different bounded region may be partially overlapping with the initial bounded region, and the overlapping portion of the region may include content items that were included in the initial region.

Example of Serving Content from an Onboard Server

Figure 2:
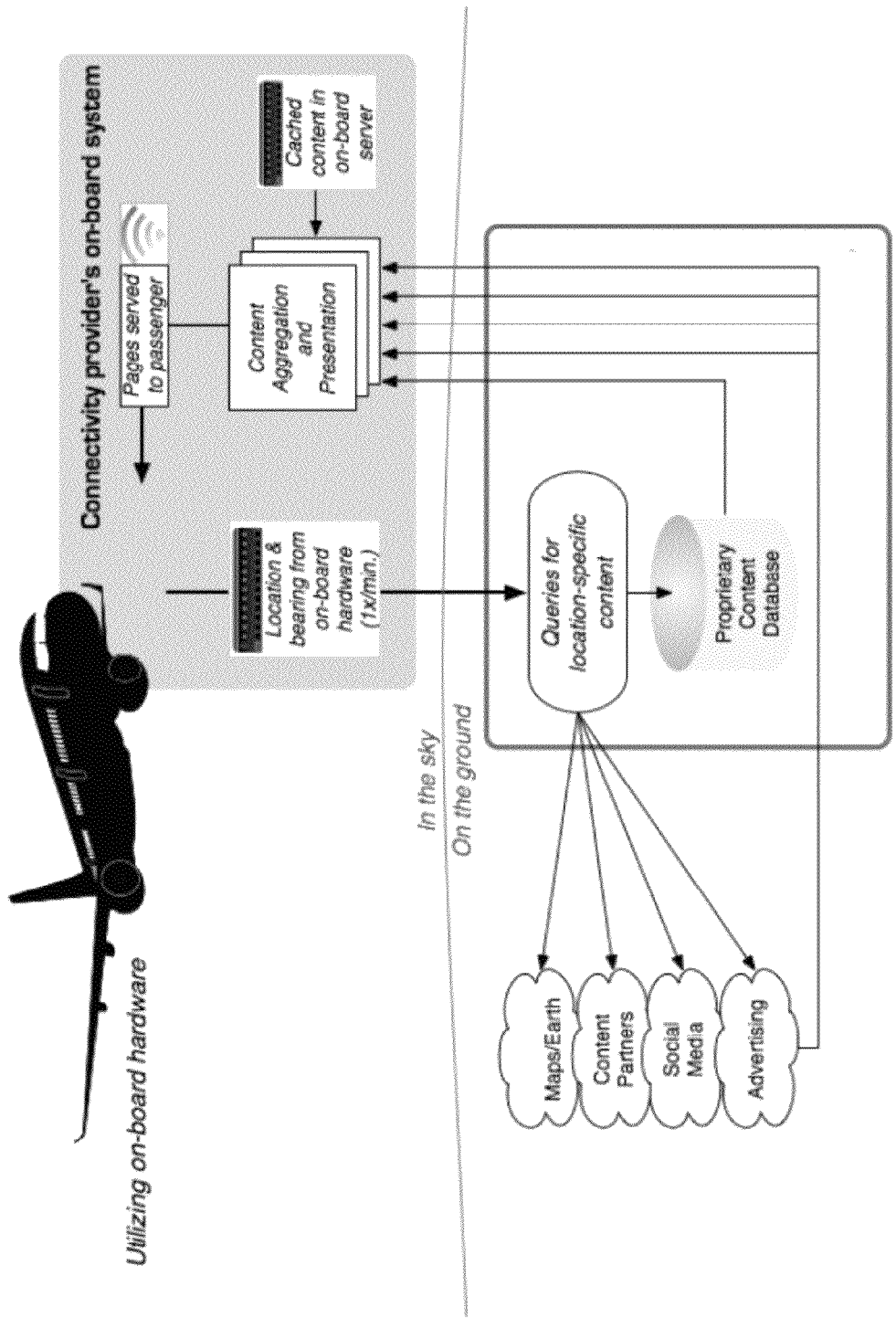
FIG. 2 is a block diagram that represents a computing system on which an embodiment using on-board hardware may be implemented.

FIG. 2 is a diagram illustrating an example of a way in which data flows to the in-flight passenger with the explicit cooperation of an airline or a firm that provides in-flight connectivity to an airline or any other entity that maintains a Web server onboard a vehicle. In an embodiment, the real-time location of the airplane is received from on-board hardware as location data. Based on the location, the server requests location-specific content information from content servers, including third-party content servers and proprietary content servers either onboard or offboard the vehicle. Content is aggregated with advertising information and location information, and the aggregated data is used to generate a map with location and content identifiers. The map is then presented to the user on the client device. In one embodiment, the map and associated content are assembled on the fly by the client device after such information is retrieved from a content server.

Figure 7:
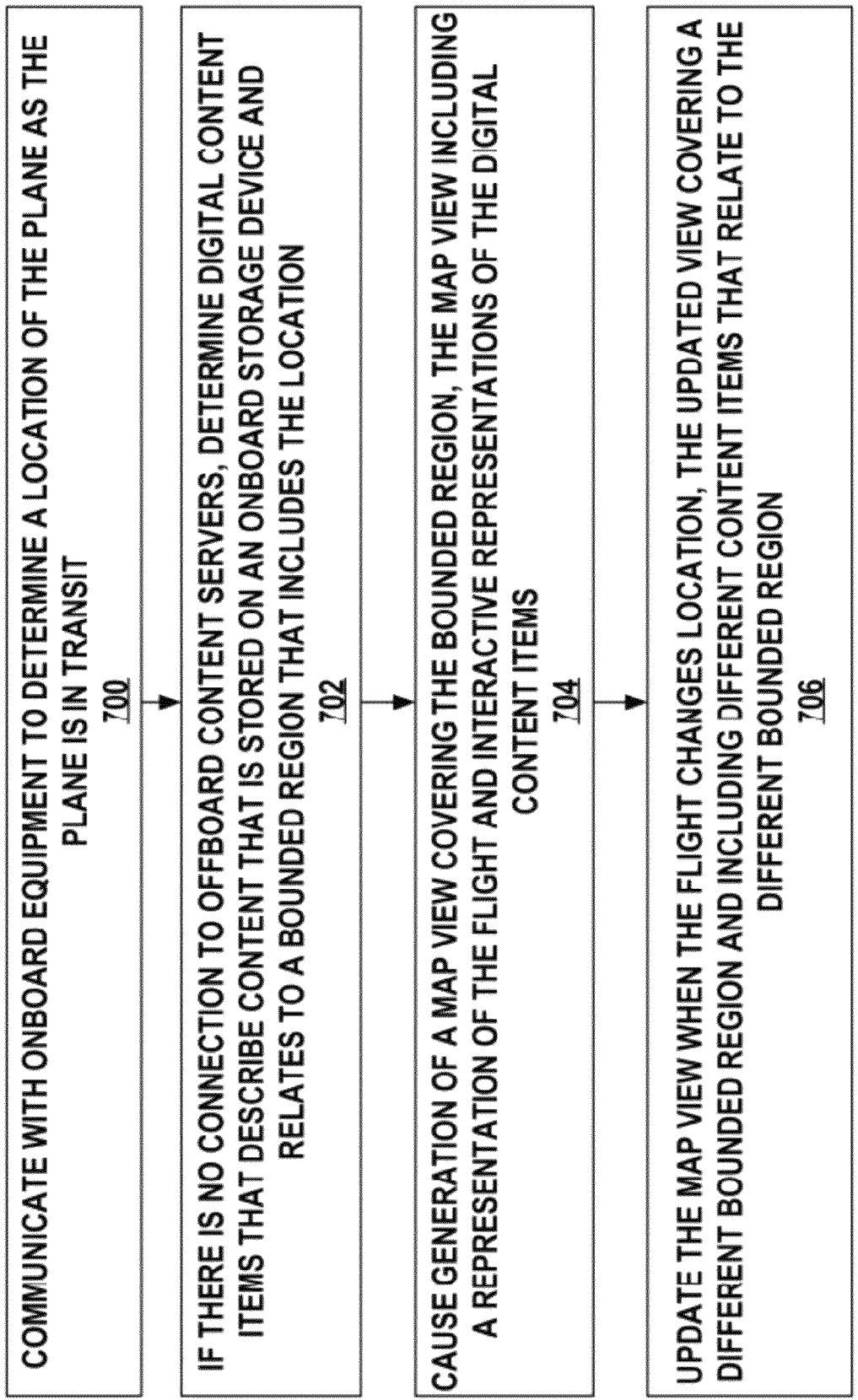
FIG. 7 is a diagram illustrating a process for an onboard server to cause display of a moving map with interactive representations of content items.
Figure 8:
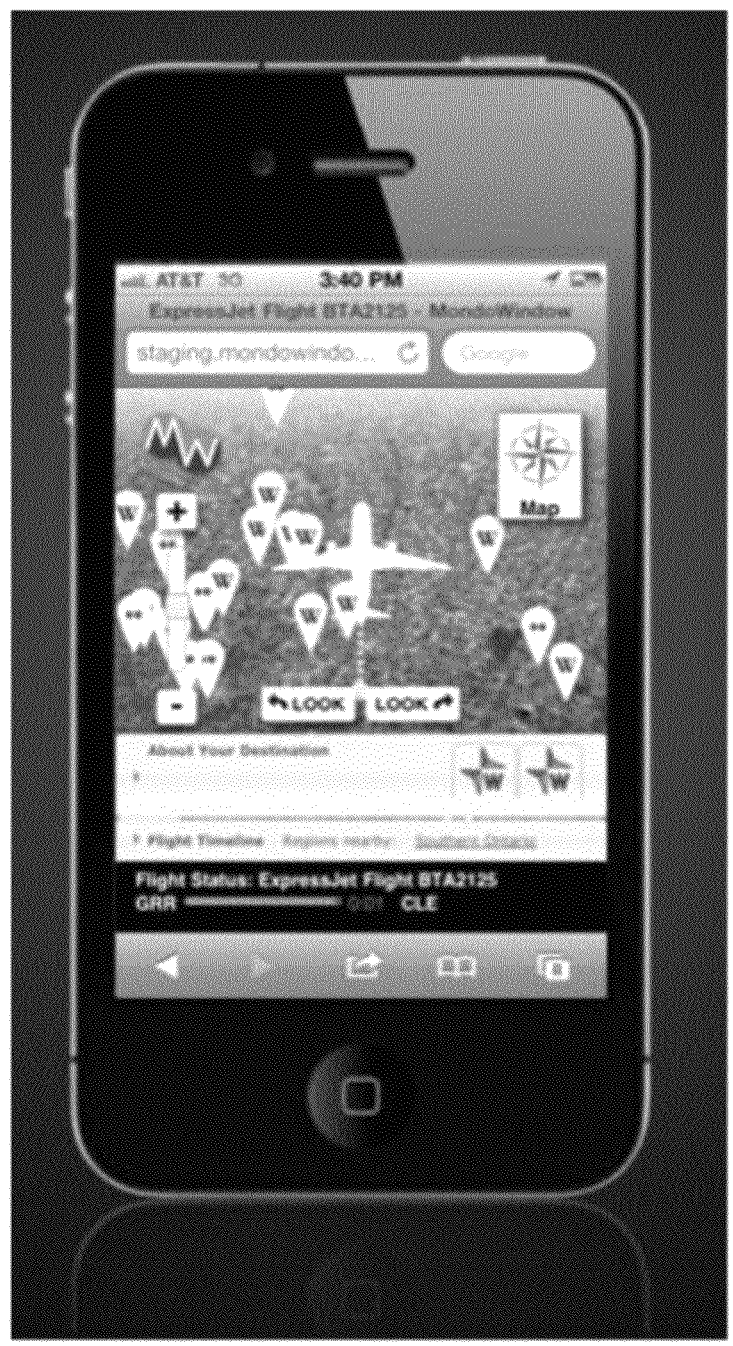
FIG. 8 illustrates an example moving map interface with Wikipedia and Flickr pins, displayed on an iPhone mobile device.
Figure 9:
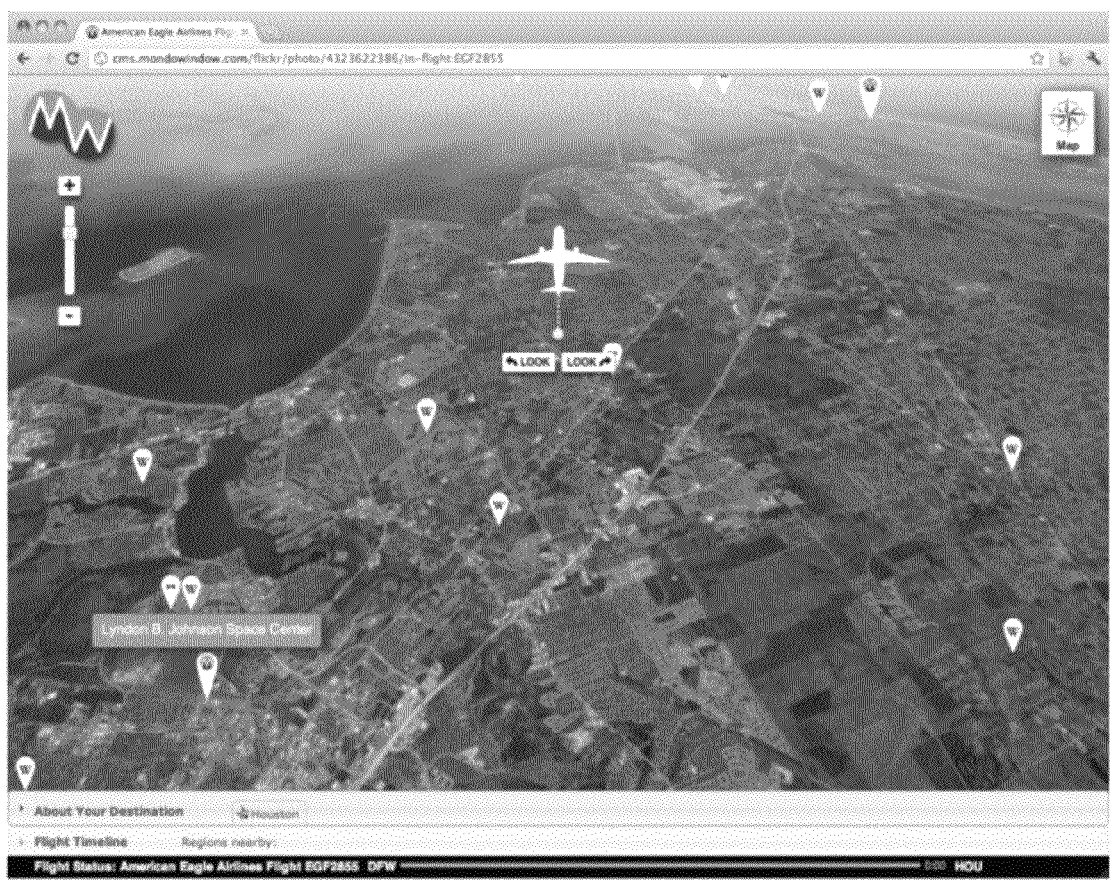
FIG. 9 illustrates an example moving map interface displayed in a Chrome browser, where a title is being displayed for the Lyndon B. Johnson Space Center. Additional information about a pin, such as the title of the pin, may be displayed in response to a user-selection of the pin, or may be displayed by default.
Figure 10:
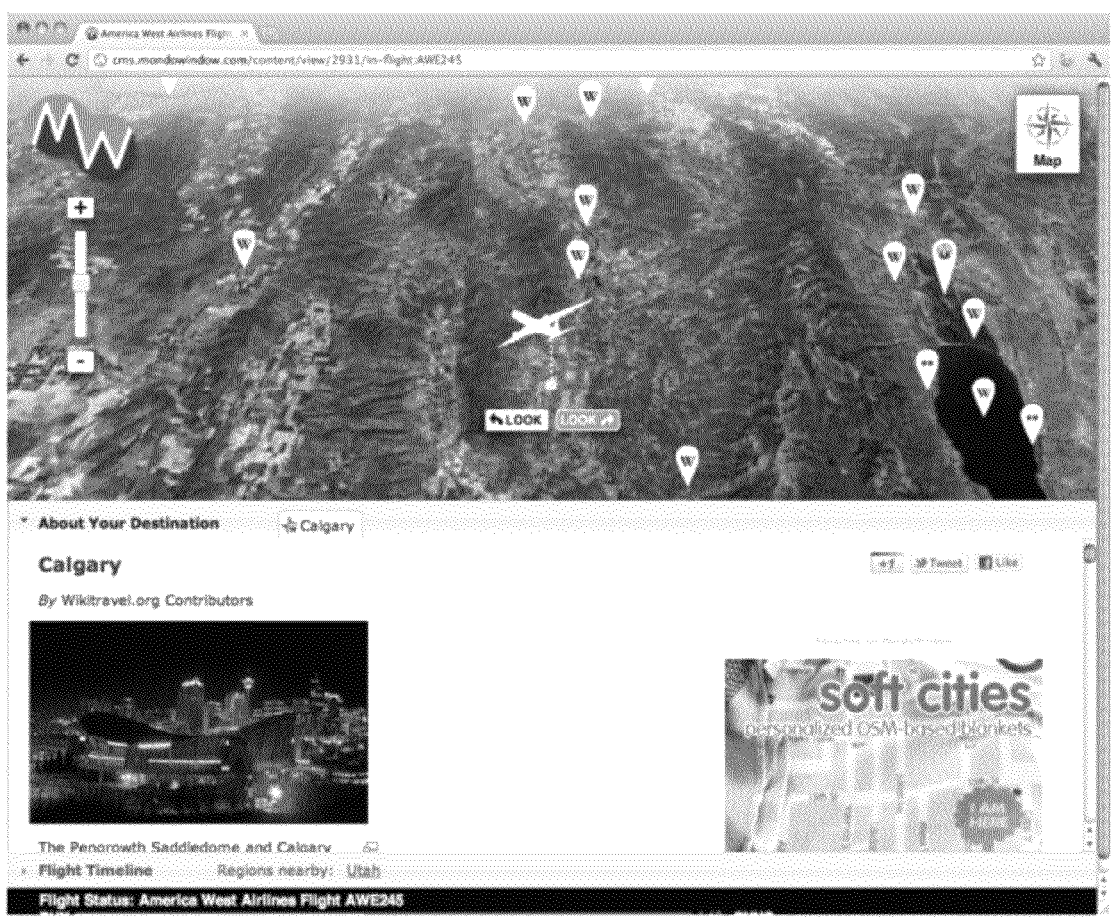
FIG. 10 illustrates an example moving map interface concurrently displayed with an information bar containing destination content about a destination of a vehicle depicted in the moving map interface. In addition to or as an alternative to content about the destination, information about regions through which the vehicle is passing, information about the vehicle itself, elevation information, information about the environment in which the vehicle is traveling, trip progress information, advertising information, or any other information such as the various types of information mentioned herein, may be displayed in the information bar.
Figure 11:
FIG. 11 illustrates an example moving map interface concurrently displayed with an information bar containing timeline information about a vehicle depicted in the moving map interface. The timeline information may include the elevation of the vehicle, the total duration of the trip, an amount of time that the vehicle has been in transit since departure from a source, an amount of time that the vehicle is expected to remain in transit until reaching a destination, information about the source or destination of the trip, or about regions around the vehicle or around the source or destination, an identity of the vehicle or trip, or any other information such as the various types of information mentioned herein.
Figure 12:
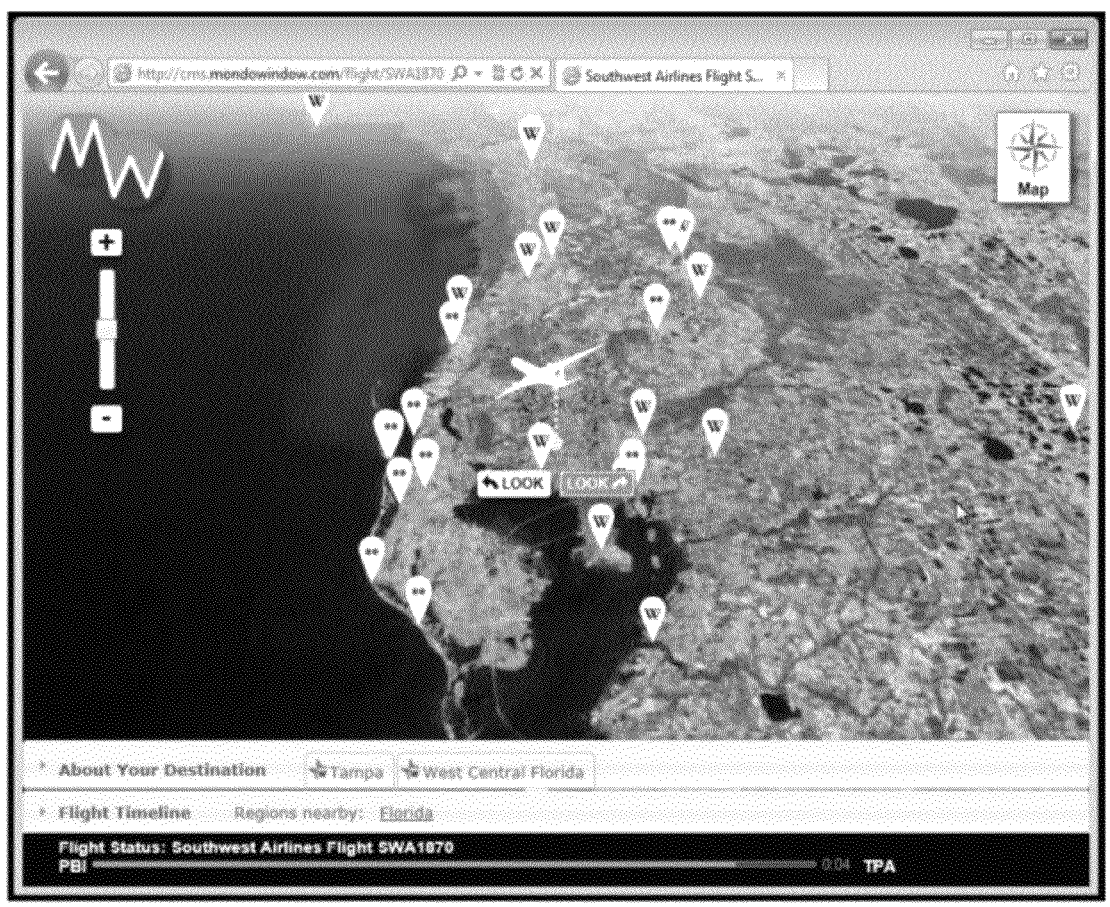
FIG. 12 illustrates an example moving map interface displayed in an Internet Explorer browser, where an option is presented to look at the moving map view from an overhead or default perspective, from a right window perspective, or from a left window perspective.
Figure 13:
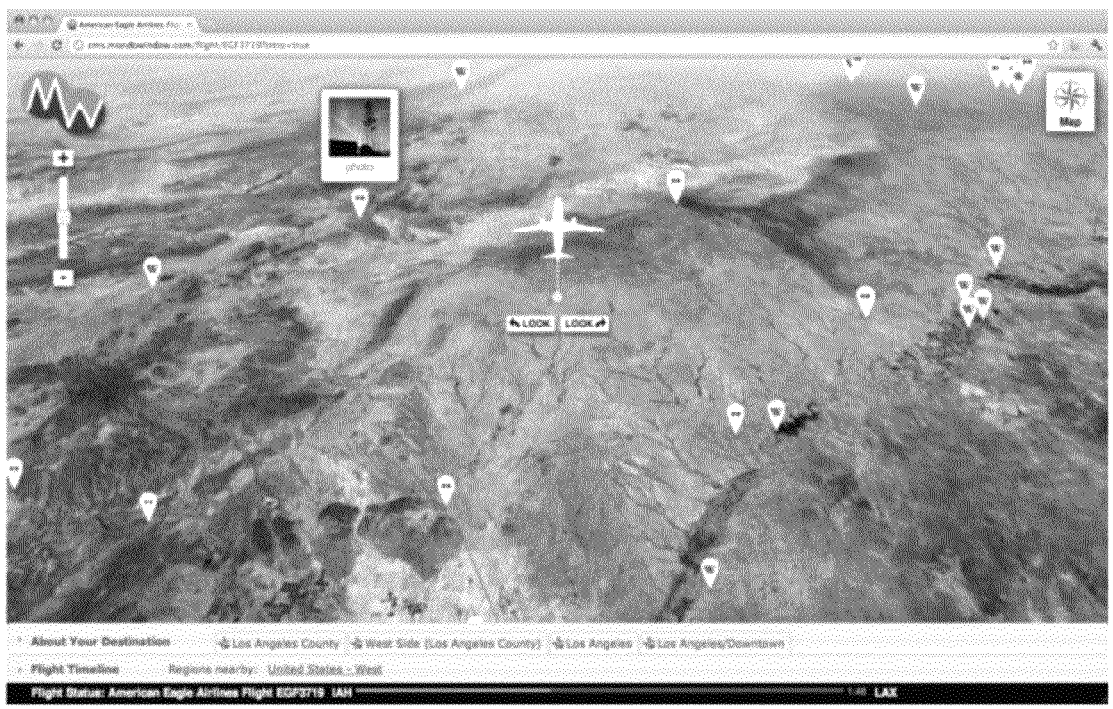
FIG. 13 illustrates an example moving map interface where a thumbnail is being displayed for a photo content pin. Additional information about a pin, such as a thumbnail of a picture associated with the pin, may be displayed in response to a user-selection of the pin, or may be displayed by default.
Figure 14:
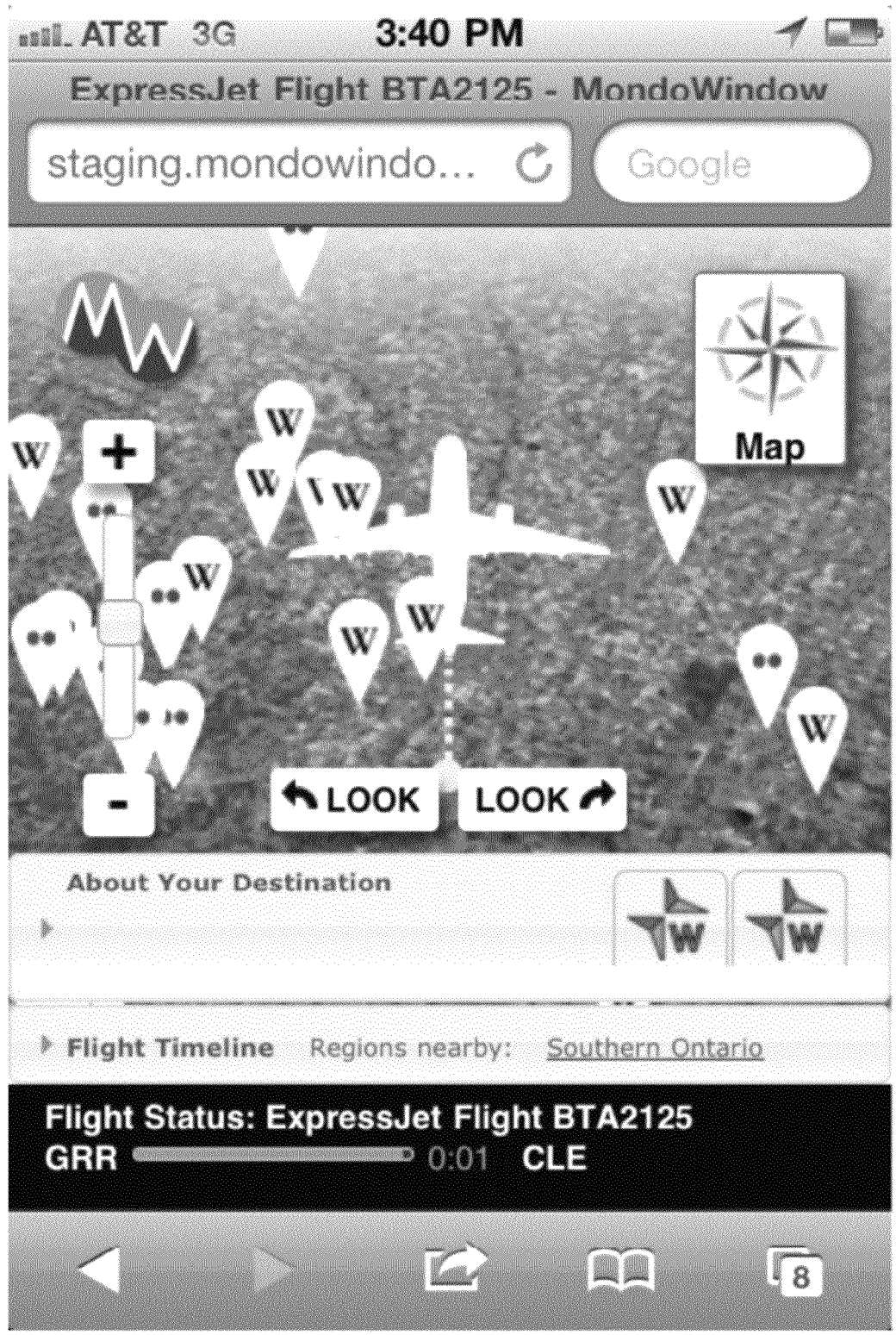
FIG. 14 illustrates an example moving map interface displayed in a browser of a portable device such as an iPhone. The moving map interface may also be displayed using a customized application installed on the portable device. The buttons on the phone may be assigned to actions unique to the moving map interface. For example, if the back button is pressed while the user is viewing content but not the moving map interface, the back button may cause the application to resume displaying the moving map interface, optionally centered at the location of the vehicle. If the back button is pressed while tooltips or other content are overlaid on the moving map interface, the back button may cause the overlaid content to disappear.
Figure 15:
FIG. 15 illustrates an example moving map interface displayed on an iPad touchscreen device.

FIG. 7 is a diagram illustrating a process for an onboard server to cause display of a moving map with interactive representations of content items. In step 700, the process includes communicating with onboard equipment to determine a location of the plane as the plane is in transit. If there is no connection to offboard content servers, in step 702, the process includes determining digital content items that describe content that is stored on an onboard storage device and relates to a bounded region that includes the location. In step 704, the process causes generation of a map view covering the bounded region. The map view includes a representation of the flight and interactive representations of the digital content items. The interactive representations are selectable to display more information about the content items. In step 706, the process includes updating the map view when the flight changes location. The updated map view covers a different bounded region and includes different content items that relate to the different bounded region. The different bounded region may be partially overlapping with the initial bounded region, and the overlapping portion of the region may include content items that were included in the initial region.

Updating the Onboard Server

In one embodiment, the onboard server is updated by updating the data on an onboard storage device. If a network connection is available to the onboard server, the data may be uploaded to the device via the network connection. The network connection may be available to the onboard server at some times but not at other times. For example, the network connection may be a wifi connection that is available to the server when the airplane has landed and parked at a terminal. As another example, the network connection may be a mobile 3G or 4G connection that is available when the airplane is on the ground but not when the airplane is traveling at high speeds through the air.

If there is no network connection available to update the onboard server with data uploaded from an offboard server, then the onboard storage device may be manually replaced periodically. For example, between scheduled trips, vehicle passenger service carrier personnel may swap out an outdated storage device for an updated storage device. The outdated storage device may be returned to a vendor for updating, and the outdated storage device may be returned to the vehicle passenger service carrier personnel as an updated storage device. The manual replacement may occur periodically, such as every day, every week, or every month. The pin location and name content, as well as the map content, may be stored on a storage device such as a Flash memory module or a hard drive that is swapped into and out of a machine residing on the vehicle. The machine may be owned and managed by onboard video service providers, or the vehicle passenger service carrier personnel, or an in-vehicle equipment or service provider, and the updated map and pin data may be swapped into the machine at the same time as updated video data. In one embodiment, the map and pin data is updated by mounting an Ethernet or other physically connected drive and transferring data, rather than by physically swapping the drives.

Example Method for Providing Location-Based In-Flight Data

In an embodiment, a travel identifier is received from a user. For example, a vehicle number, itinerary number, or tail number may be received from a user. Based on the identifier, location information associated with the user and one or more digital content items that are associated with the location are determined. A view is generated. The view includes a first visual representation of the location information associated with the user. For example, the location of the vehicle the user is interested in may be identified by a marker on a map. A visual representation of a content item is also included in the view. The content item may be a content item that is associated with a location that is near the location of the vehicle. In an embodiment, multiple content items may be identified on the map using visual representations.

In an embodiment, the travel identifier may identify any type of transportation record, such as a train or bus number. The view may include content selected by the user, and that content may be displayed adjacent to, overlaid on, concurrently with, or instead of the map. Any number of visual representations may be displayed on the map.

Example User Interface

Figure 3:
FIG. 3 represents an example user interface in an embodiment.

FIG. 3 represents an example user interface in an embodiment. The user interface includes a map region for displaying map tiles and visual representations, such as markers, of content items and/or location information. Content markers are placed on a map according to location information associated with the content items, which is received from the content server providing each content item. When a user interacts with a content item (by hovering a cursor over the item, for example), a "pop-up" window, Javascript modal window, overlaid window, or tooltip may provide more detailed information, such as a title, associated with the content item. Further interaction, such as the selection of the content item by the user may cause the content to be displayed in a content region of the user interface.

FIG. 4A represents an example user interface with a look-ahead feature in an embodiment. FIG. 4B represents an example user interface with a directional view feature in an embodiment. FIGS. 4A and 4B provide different perspectives available to the user in the user interface. Different content items may be displayed depending on the perspective of the user. This is like looking out a window of an airplane. If a passenger were looking out the right-hand window of an airplane, the passenger would have an expanded view of that side of the airplane, while losing some or all of the view associated with the other side of the airplane. Changing views within the interface may encourage passengers to actually look out of a particular window of an airplane to see if the passenger can see what is depicted in the view.

Advertising

Location, destination, social networks, and self-declared interests of the user are used to create brand new, hyper-targeted advertising opportunities. Las Vegas information, for example, can be placed in front of anyone who flies within a thousand miles of their casinos. State tourism bureaus and ski resorts can entice potential visitors flying overhead. Hotels, theaters, restaurants, and car rental agencies can unload excess inventory to inbound passengers. The possibilities for location-based and just-in-time advertising are immense.

The advertising content may be uploaded in a similar manner as the regular content, with an additional agreement that the advertiser pays the moving map provider or the user for each access or each N accesses (such as each thousand accesses) to the advertisement by users in flight.

In one embodiment, the moving map engine can determine whether someone is accessing the moving map engine interface from a plane, on the ground, or in the water based on the IP address for live connections. For example, users accessing the site from a Gogo router are likely in flight. The moving map engine may also predict that the user is in flight if the user has purchased a ticket for the flight through a travel management system to which the user has provided his or her authentication information. If, upon accessing the user's account, the moving map engine determines that the user has purchased a ticket for the flight and the flight is moving, the moving map engine may confidently predict that the user is in flight. The user may also determine when someone is likely not in flight, such as by determining the user's ground location via GPS or cell signal triangulation. Even if the user leaves his or her cell phone on while in flight, and even if the user can get a cell signal, the user is likely to be moving at incredible speeds that would indicate the user is in the air and not on the ground. Determining that the user is on the ground may also be accomplished by determining that the user's IP address or wifi region is not associated with an in-flight Internet Service Provider (ISP).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
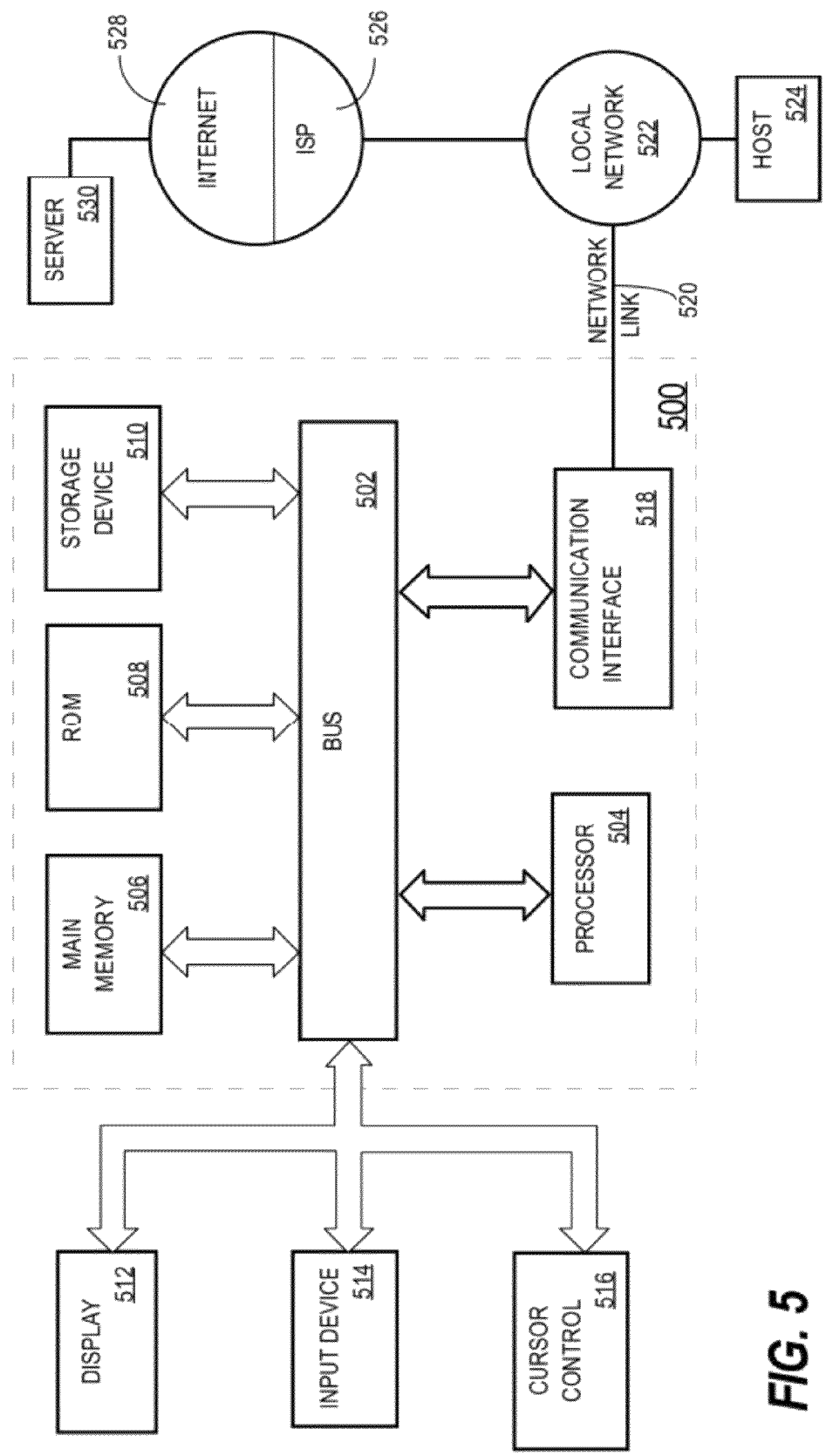
FIG. 5 is a block diagram that represents a computing system on which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, stored in storage device 510, or other non-volatile storage for later execution, or passed back into the network whether or not it is executed.

As used in the specification and claims, the terms "first," "second," and "third" are used as arbitrary naming conventions to distinguish named items from each other; unless otherwise expressly stated in the specification or in the claims, these names do not indicate any ordering of the items with respect to each other. For example, when discussing three different items, the items may be arbitrarily named "first item," "second item," and "third item." Such names do not imply anything about where the items are located or when the items were created or otherwise become relevant. The names merely provide an easy mechanism for referring back to a particular item that was previously mentioned even though multiple items may have been previously mentioned. Furthermore, the mere fact that one step is mentioned before another step does not require the previously mentioned step to occur first-in-time unless such a requirement is apparent within the substance of the steps.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

a server onboard an airplane communicating with equipment onboard the airplane to determine a first location of the airplane as the airplane is in transit;

the server determining a first set of digital content items that are (a) stored on a storage device on the airplane and (b) related to a first bounded region that includes the first location;

the server causing generation of a first map view covering the first bounded region, wherein the first map view includes:

a first graphical representation of the flight at the first location in the first bounded region, and a second graphical representation of a first content item of the first set of digital content items that describe content related to the first bounded region;

the server causing a client onboard the airplane to display the first map view;

the server communicating with the equipment to determine that the airplane has moved to a second location as the airplane is in transit;

the server determining a second set of digital content items that are (a) stored on the storage device on the airplane, and (b) related to a second bounded region that includes the second location;

the server causing generation of a second map view covering the second bounded region, wherein the second map view includes:

the first graphical representation of the flight at the second location in the second bounded region, and a third graphical representation of a second content item of the second set of digital content items that describe content that relates to the second bounded region;

the server causing the client onboard the airplane to display the second map view;

the server receiving an indication that a user has selected the second graphical representation of the third graphical representation, and, in response to the user selection, the server causing the client to display additional information associated with the first content item or the second content item;

wherein the method is performed by one or more special-purpose computing devices.

2. The method of claim 1, further comprising:

the server determining whether or not the client has a connection for retrieving information from content servers offboard the airplane;

in response to determining that the client does not have the connection, the server including, in the map views, representations of only the content items that are stored on the storage device on the airplane.

3. The method of claim 1, further comprising:

the server determining whether or not the client has a connection for retrieving information from a content server offboard the airplane;

in response to determining that the client does have the connection, the server including, in the map views, representations of content items that are stored on the content server.

4. The method of claim 1, wherein the equipment onboard the airplane is a data bus, and wherein the server communicates with the data bus according to the ARINC 429 protocol.

5. The method of claim 1, wherein the storage device on the airplane stores a plurality of digital content items comprising the first set of content items and the second set of content items, further comprising updating the storage device on the airplane to include additional digital content items that were uploaded, by users, to a content management system after the plurality of digital content items that are stored on the storage device.

6. The method of claim 1, wherein the storage device on the airplane stores a plurality of map tiles, wherein the first map view is generated using a first subset of the plurality of map tiles, and wherein the second map view is generated using a second subset of the plurality of map tiles.

7. The method of claim 1, wherein the first map view comprises an oblique view of the first bounded region, and wherein the second map view comprises an oblique view of the second bounded region, wherein the storage device on the airplane stores a digital elevation model comprising a plurality of elevations, wherein the first map view is a first three-dimensional view that is generated using a first subset of the plurality of elevations, and wherein the second map view is a second three-dimensional view that is generated using a second subset of the plurality of elevations.

8. The method of claim 1, wherein determining the second set of digital content items that describe content that relates to the second bounded region comprises determining that the second content item is stored in association with a third region that at least partially overlaps the second bounded region, wherein the second content item is stored in association with the third region as a whole and not any particular point within the third region.

9. The method of claim 1, wherein the first content item is one of a picture, a comment, text, a video, a song or sound file, a Web site, an article, a game, or social networking content, and wherein the second content item is another of a picture, a comment, text, a video, a song or sound file, a Web site, an article, a game, or social networking content.

10. The method of claim 1, wherein the first set of content items does not include the second content item, wherein the second set of content items does not include the first content item, and wherein the first bounded region overlaps the second bounded region.

11. A storage device storing instructions, which, when executed by a computing device onboard an airplane, cause:

a server communicating with equipment onboard the airplane to determine a first location of the airplane as the airplane is in transit;

the server determining a first set of digital content items that are (a) stored on the storage device on the airplane and (b) related to a first bounded region that includes the first location;

the server causing generation of a first map view covering the first bounded region, wherein the first map view includes:

a first graphical representation of the flight at the first location in the first bounded region, and a second graphical representation of a first content item of the first set of digital content items that describe content related to the first bounded region;

the server causing a client onboard the airplane to display the first map view;

the server communicating with the equipment to determine that the airplane has moved to a second location as the airplane is in transit;

the server determining a second set of digital content items that are (a) stored on the storage device on the airplane, and (b) related to a second bounded region that includes the second location;

the server causing generation of a second map view covering the second bounded region, wherein the second map view includes:

the first graphical representation of the flight at the second location in the second bounded region, and a third graphical representation of a second content item of the second set of digital content items that describe content that relates to the second bounded region;

the server causing the client onboard the airplane to display the second map view;

the server receiving an indication that a user has selected the second graphical representation or the third graphical representation, and, in response to the user selection, the server causing the client to display additional information associated with the first content item or the second content item.

12. The storage device of claim 11, wherein the instructions, when executed by a computing device onboard the airplane, further cause:

the server determining whether or not the client has a connection for retrieving information from content servers offboard the airplane;

in response to determining that the client does not have the connection, the server including, in the map views, representations of only the content items that are stored on the storage device on the airplane.

13. The storage device of claim 11, wherein the instructions, when executed by a computing device onboard the airplane, further cause:

the server determining whether or not the client has a connection for retrieving information from a content server offboard the airplane;

in response to determining that the client does have the connection, the server including, in the map views, representations of content items that are stored on the content server.

14. The storage device of claim 11, wherein the equipment onboard the airplane is a data bus, and wherein the server communicates with the data bus according to the ARINC 429 protocol.

15. The storage device of claim 11, wherein the storage device stores a plurality of digital content items comprising the first set of content items and the second set of content items, further comprising updating the storage device to include additional digital content items that were uploaded, by users, to a content management system after the plurality of digital content items that are stored on the storage device.

16. The storage device of claim 11, wherein the storage device stores a plurality of map tiles, wherein the first map view is generated using a first subset of the plurality of map tiles, and wherein the second map view is generated using a second subset of the plurality of map tiles.

17. The storage device of claim 11, wherein the first map view comprises an oblique view of the first bounded region, and wherein the second map view comprises an oblique view of the second bounded region, wherein the storage device stores a digital elevation model comprising a plurality of elevations, wherein the first map view is a first three-dimensional view that is generated using a first subset of the plurality of elevations, and wherein the second map view is a second three-dimensional view that is generated using a second subset of the plurality of elevations.

18. The storage device of claim 11, wherein the instructions, when executed by a computing device onboard the airplane, cause determining the second set of digital content items that describe content that relates to the second bounded region at least in part by determining that the second content item is stored in association with a third region that at least partially overlaps the second bounded region, wherein the second content item is stored in association with the third region as a whole and not any particular point within the third region.

19. The storage device of claim 11, wherein the first content item is one of a picture, a comment, text, a video, a song or sound file, a Web site, an article, a game, or social networking content, and wherein the second content item is another of a picture, a comment, text, a video, a song or sound file, a Web site, an article, a game, or social networking content.

20. The storage device of claim 11, wherein the first set of content items does not include the second content item, wherein the second set of content items does not include the first content item, and wherein the first bounded region overlaps the second bounded region.

21. The method of claim 1, wherein the second graphical representation or the third graphical representation were selected on a touch-screen.

22. The storage device of claim 11, wherein the second graphical representation or the third graphical representation were selected on a touch-screen.

* * * * *